INVENTOR.
JAMES W. BENFIELD
BY
MORGAN, FINNEGAN, DURHAM & PINE
ATTORNEYS

INVENTOR.
JAMES W. BENFIELD
BY
MORGAN, FINNEGAN, DURHAM & PINE
ATTORNEYS

May 7, 1968 J. W. BENFIELD 3,381,814

WASTE RECEPTACLE

Filed Oct. 22, 1965 4 Sheets-Sheet 3

INVENTOR.
JAMES W. BENFIELD
BY
MORGAN, FINNEGAN, DURHAM & PINE
ATTORNEYS

May 7, 1968 J. W. BENFIELD 3,381,814

WASTE RECEPTACLE

Filed Oct. 22, 1965 4 Sheets-Sheet 4

INVENTOR.
JAMES W. BENFIELD

BY
MORGAN, FINNEGAN, DURHAM & PINE

ATTORNEYS

United States Patent Office 3,381,814

Patented May 7, 1968

1

3,381,814
WASTE RECEPTACLE

James W. Benfield, 60 Pinewood Road, Hartsdale, N.Y. 10530

Continuation-in-part of application Ser. No. 433,980, Feb. 19, 1965. This application Oct. 22, 1965, Ser. No. 507,984
9 Claims. (Cl. 206—63.5)

This application is a continuation-in-part of my copending application Ser. No. 433,980, filed Feb. 19, 1965, now abandoned.

This invention relates generally to waste receptacles, and relates more particularly to a new and improved waste receptacle of utility especially in dentists' offices, which is adapted to be positioned on the dentist's work tray.

A dentist in his work in the oral cavity of a patient uses small bunches of cotton, or cotton pellets, to dry or medicate a tooth cavity. The cotton pellets are conventionally handled by a pair of spring forceps, or "cotton pliers," which are normally held by the dentist in one hand between the thumb and forefinger. Thus, the cotton is picked out of a container and placed in the area to be dried or medicated. When the absorption or medication has been effected, the cotton is removed and must be disposed of.

It has previously been recognized that a wastebasket or similar receptacle on the floor is an inadequate waste receiver for the used cotton or cotton pellets and prior proposals have been made for constructing relatively small dental waste receptacles adapted to be positioned on the dentist's work tray. Thus, it has been proposed to mount an inner paper or cardboard waste receptacle in a supporting base and to form intersecting transverse slits in one end of the waste receptacle for pulling the used cotton off the tips of the forceps when they are poked into the transverse slits.

These prior proposals, however, have performed with a great deal of inefficiency and have had various disadvantageous structural features. The transverse slits have been formed with a square edge on both the outer and inner sides of the receptacle end piece and the narrow slits have intersected in substantially a point. In its initial use, while the paper or cardboard is dry and stiff, this construction inhibits entry of the forceps and the small intersection point causes the cardboard to press firmly against the legs of the forceps, inhibiting their release of the cotton; in the later stages of use the cardboard edges become wet and limp due to the moisture absorbed from the cotton and provide little or no resistance for retaining the cotton. Further, in one prior construction, the waste receptacle is in the form of a cardboard box which is mounted in a glass holder. The cardboard boxes are received by the dentist as flat pieces of cardboard and must be folded along creases into the oblong boxes. This folding operation takes valuable time away from the dental assistant. Furthermore, the glass holder is unnecessarily large and bulky due to its low density, and takes up valuable space on the dentist's work tray.

It is therefore an object of this invention to provide a new and improved waste receptacle which overcomes the disadvantages of the prior art.

Another object of this invention is to provide a new and improved waste receptacle which efficiently removes cotton, or other material to be disposed of, from a pair of forceps without manual assistance.

2

Another object of this invention is to provide a new and improved waste receptacle which facilitates entry thereinto of the tips of a pair of forceps and the material to be disposed of but which effectively retains the material to be disposed of within the receptacle upon removal of the forceps therefrom.

Another object of this invention is to provide a new and improved waste receptacle for sanitary use in medical offices, constructed so as to prevent cross-contamination between patients.

Another object of their invention is to provide a new and improved disposable dental waste receptacle, adapted to be replaced after each patient for complete sanitation.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Briefly described, the present invention comprises a new and improved waste receptacle which efficiently removes used cotton, cotton pellets, or other similar material, from a pair of forceps without further manual assistance.

The waste receptacle is in the form of a closed container member and, as here preferably embodied, includes a cylindrical cap snap-fittted onto a similarly shaped cylindrical cup. The top of the cap is provided with a plurality of equispaced radial slits, preferably five in number, forming an equal numeral of sectors therebetween, the sectors being scored on their top surface adjacent each edge of each of the slits so as to form a radius or bevel on the outer edges of the slits. The radial slits intersect at a common point located substantially centrally of the cap. As here preferably embodied, this common point comprises a center hole having a cross-section greater than that of any one of the slits.

The waste receptacle is conveniently adapted to be receivably mounted in a supporting base member. As here preferably embodied, the base comprises an open-ended generally cylindrical sleeve body, the top end of which is circular in section, the bottom end having a hexagonally shaped cross-section. A cylindrical bore extends through the base member having an annular shoulder near the top end thereof. The shoulder is adapted to seat the bottom peripheral edge of the container cap, and positions the top surface of the cap well above the top rim of the base member.

The diameter of the bore in the base member above the shoulder is adapted to receive the container cap in a tight frictional fit. To this end, in a preferred alternate embodiment, the container cap is formed with a plurality of vertical splines on its outer circumferential surface, the splines being positioned in alignment with, and corresponding in number to, the radial slits formed in the top of the cap.

It will be understood that the foregoing general description and the following detailed description as well are exemplary and explanatory of the invention but are not restrictive thereof. Thus, while the waste receptacle of this invention is particularly adapted to and was developed for use as a dental waste receptacle, the principles underlying the operation of the invention are not limited to such usage. However, since the invention is particularly adaptable to such usage, reference will be made hereinafter thereto in order to provide an example of a practical and useful embodiment of the invention.

The accompanying drawings, referred to herein and constituting a part hereof, illustrate in a first embodiment and an alternate preferred embodiment, the invention and, together with the description, serve to explain the principles of the invention.

Figure 8:
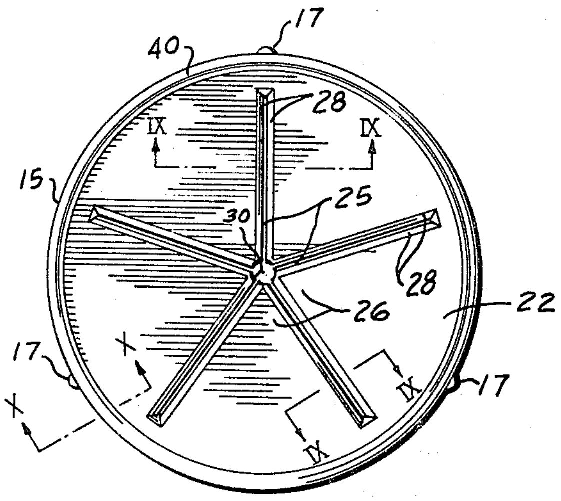
FIGURE 8 is an enlarged top plan view of the receptacle cap shown in FIGURE 1, illustrating the center hole formed at the intersection of the radial slits.
Figure 10:
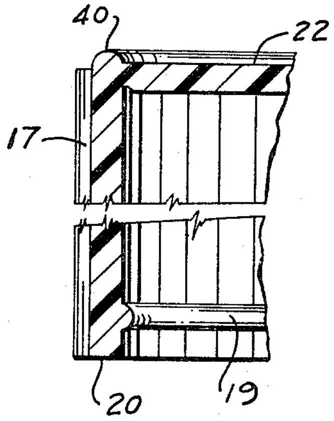
Figure 11:
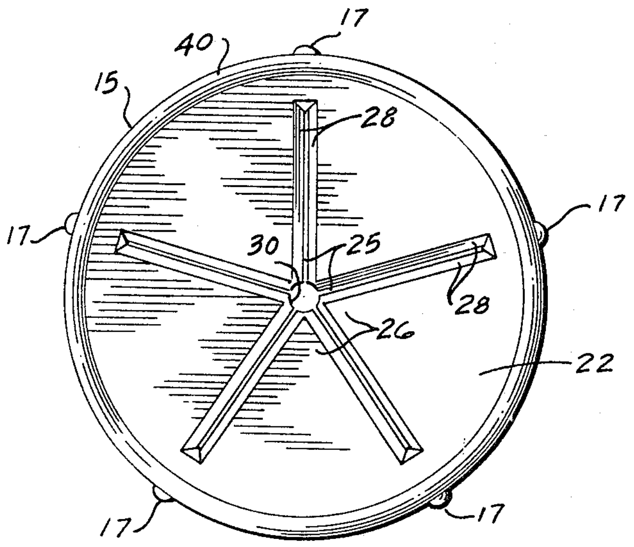

FIGURE 10 is a fragmentary sectional view taken along line X—X of FIGURE 8, illustrating a vertical spline on the outer circumferential surface, and an annular bead on the inner circumferential surface, of said receptacle cap; and FIGURE 11 is an enlarged top plan view of a preferred alternate embodiment of the receptacle container cap of the invention, illustrating five vertical splines on the outer circumferential surface of the cap in aligned, equispaced relationship with five radial slits in the top of the cap.

Referring now more particularly to the embodiment of the invention shown in the accompanying drawings, there is illustrated a waste receptacle and a waste receptacle supporting base, designated generally by reference numerals 10 and 12, respectively.

Waste receptacle 10 is in the form of a closed container member. As here preferably embodied, this container comprises a cylindrical cup 14 and a cap 15 adapted to be tightly fitted thereon. To this end, the mouth of cup 14 has a slightly greater diameter than the bottom so as to form an annular lip 18 on the exterior surface thereof and an annular bead 19 is formed on the inner circumferential surface of cap 15, near the bottom peripheral edge 20 thereof. When cap 15 is placed over the mouth of cup 14, bead 19 is adapted to rest under lip 18, holding the cap onto the cup in a tight, snap-fitting relationship.

Figure 9:
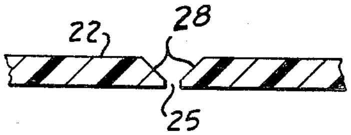
FIGURE 9 is a fragmentary sectional view taken along line IX—IX of FIGURE 8, illustrating the scored upper edges of one of the radial slits formed in the receptacle cap.

As best illustrated in FIGURES 8–10, the top surface 22 of cap 15 is provided with a plurality of substantially centrally located, equispaced, radial slits 25, forming surface 22 into an equal plurality of sectors 26, adapted to be flexed downwardly into cup 14 by a downward force, as would be exerted by a dentist's forceps as he forces the cotton or other material to be disposed of downwardly into the cup, and to spring back into the plane of the surface 22 upon the removal of the force.

Each of the sectors 26 is scored on the top surface 22 adjacent each edge of each of the slits 25 so as to form a marked radius or beveled lead 28 along the outer edges of the slits. It has been found that this construction, wherein the outer edges of the sectors are rounded or beveled while the inner edges remain substantially square, significantly increases the effectiveness of the sectors in removing cotton, or other material to be disposed of, from a pair of forceps, in that it facilitates entry of the forceps and material into the cup while the square undersurface grabs the material to be disposed of with great efficiency.

The plurality of substantially centrally located radial slits 25 intersect in a center horizon, located substantially in the center of the cap 15. As here preferably embodied, this center portion comprises a center hole 30, having a cross-section greater than that of any one of the slits 25. It has been found that a center hole having a diameter slightly larger than the width of the scored slits, as illustrated in FIGURE 8, gives satisfactory results. The provision of a center hole further increases the effectiveness of the sectors in removing material from a pair of forceps, in that it reduces the lateral pressure of the sectors bearing against the legs of the forceps, permitting expansion of the legs and release of the material.

As here preferably embodied, the plurality of radial slits 25 comprises five in number. It has been found that this number of slits further significantly increases the effectiveness of the sectors in removing cotton or other adherent material to be disposed of, from a pair of forceps, in that their flexibility is considerably increased over a construction utilizing only four slits, facilitating entry of the forceps, and yet they are strong enough to provide substantial resistance, permitting the square bottom edges to scrape the material to be disposed of from the legs of the forceps.

The waste receptacle 10 is conveniently adapted to be mounted in a relatively heavy supporting base 12 when it is desired to use receptacle 10 as a dental waste receptacle, positioned on the dentist's work tray. It will be understood that base 12 may have various external shapes. As here preferably embodied, base 12 is frusto-conical, being circular in section at its top 32, with flats 33 formed along the outer surface 34 so as to terminate in a hexagonally-shaped cross-section at the bottom 35. A cylindrical bore 37 extends through the center of base 12, bore 37 being provided with an annular shoulder 38 near the top end of the base.

The diameter of bore 37 above shoulder 38 is adapted to receive the cap portion 15 of the waste receptacle in tight, friction-fitting relationship. To this end, a plurality of equispaced vertical splines 17, preferably three in number, are formed on the outer circumferential surface of cap 15, splines 17 serving to take up any slack resulting from tolerances in the machining of the bore 37.

In a preferred alternate embodiment of the invention, the plurality of vertical splines 17 is equal in number to the radial slits formed in the top of cap 15, and each of the splines is positioned in direct alignment with a respective radial slit formed in the top of the cap. It has been found that this construction not only permits a tight friction fit of cap 15 within bore 37 of the base member, but also directs the lateral pressure radially along each of the slits toward the center of the cap. This results in equalized pressure all around the cap and prevents the sectors from becoming distorted and closing one or more of the slits 25. This embodiment of the invention is illustrated in FIGURE 11, wherein five vertical splines 17 are provided on the outer circumferential surface of cap 15, each of splines 17 being positioned in direct alignment with one of the five radial slits 25 formed in the top of the cap.

Figure 1:
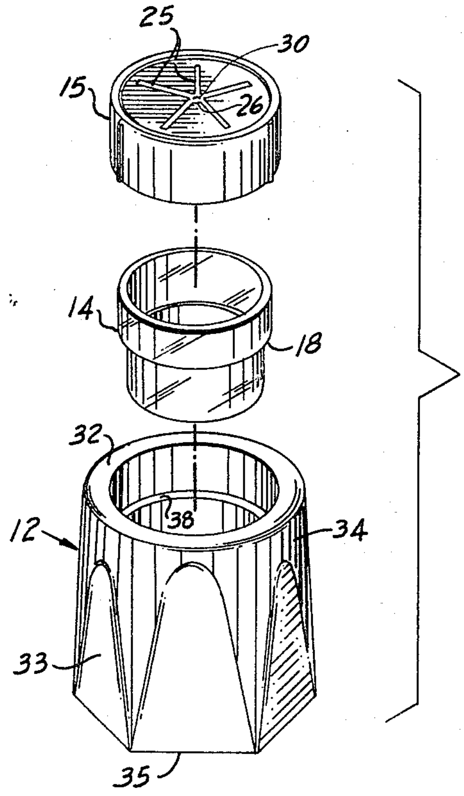
FIGURE 1 is an exploded isometric view of a waste receptacle and supporting base embodying this invention, the components being drawn out upon their common axis.
Figure 2:
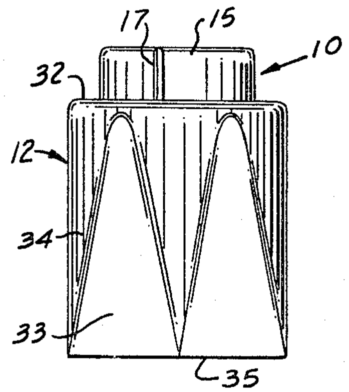
FIGURE 2 is a view in side elevation of the receptacle and base shown in FIGURE 1, illustrating the components in their assembled relationship.
Figure 3:
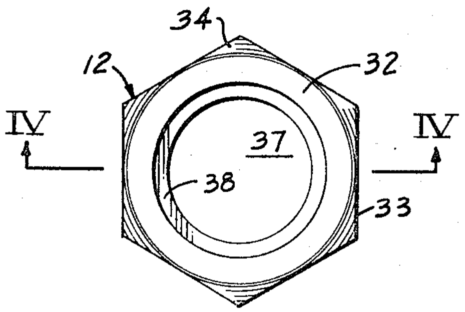
FIGURE 3 is a top plan view of the supporting base illustrated in FIGURES 1 and 2.
Figure 7:
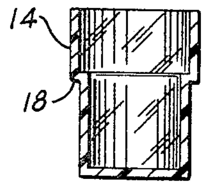
FIGURE 7 is a cross-sectional view of the receptacle cup shown in FIGURE 1.
Figure 4:
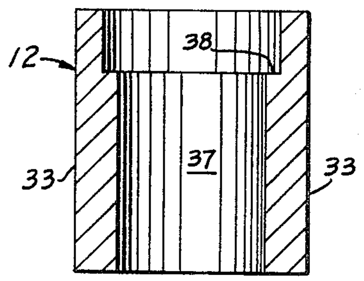
FIGURE 4 is a sectional view taken along line IV—IV of FIGURE 3.
Figure 6:
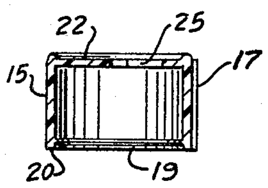
FIGURE 6 is a cross-sectional view of the receptacle cap shown in FIGURE 1.
Figure 5:
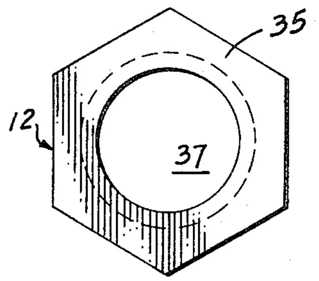
FIGURE 5 is a bottom plan view of the supporting base illustrated in FIGURES 1 and 2.

Shoulder 38 seats the bottom peripheral edge 20 of cap 15 and is located in bore 37 so as to position the top surface of the cap well above the top rim 32 of base 12, as illustrated in FIGURE 2.

Rim 32 thus provides a rest for the dentist's middle fingers so that the tips of the forceps may be accurately guided to the central hole and radial slits of the cap 15 by the thumb and forefinger to dispose the used material carried thereby without touching the top of the base, reducing the possibility of contaminating the base and, hence, cross-contamination between patients.

The chance of possible cross-contamination between patients is further reduced in the waste receptacle constructed in accordance with this invention by providing a bead 40 extending around the top peripheral edge of the cap 15. Bead 40 serves to prevent liquids which may be present on the top surface 22 from dripping over the edge of the cap and onto the base 12 and being transferred to a subsequent patient. Further, bead 40 serves to prevent the forceps or other instruments from skidding off the top of the cap and onto the base member.

The diameter of bore 37 below shoulder 38 is adapted to receive the bottom portion of cup 14. Thus it will be seen that waste receptacle 10 is inserted into bore 37 from the top and pressed thereinto until edge 20 of cap 15 seats on shoulder 38. The receptacle is removed from the base by pressing against the bottom of the cup 14 until the receptacle pops out of the bore 37.

While the invention is in no way limited to the use of particular materials in the construction thereof, certain materials have been found to produce highly satisfactory results. Thus both cup 14 and cap 15 are preferably constructed from a suitable flexible plastic material, such as, for example, polyethylene, the plastic of cap 15 being of sufficient rigidity so that the sectors will act as scrapers to pull cotton or other material off a pair of forceps. While the plastic of cap 15 may be opaque, the plastic of cup 14 is preferably transparent so that it can be immediately determined if a waste receptacle has been used, preventing its being used for more than one patient. Supporting base 12 is preferably constructed from a relatively high density metallic material, such as, for example, steel or bronze, and may be polished or chrome plated to provide a pleasing exterior finish. This provides a base having sufficient weight to provide adequate stability at about one-third the size of the previously proposed glass holder.

With the foregoing description in mind, the use of a waste receptacle constructed in accordance with the invention as a dental waste receptacle is as follows:

The waste receptacle 10, comprising the cap 15 releasably lockably snap-fitted onto cup 14, is pressed with a friction fit into the top end of bore 37 of supporting base 12 until the bottom peripheral edge 20 of the cap seats on shoulder 38 of the bore. The base, with receptacle 10 mounted therein, is placed on the dentist's work tray. The used cotton or other material held between the ends of a pair of forceps is accurately guided towards the center hole 30 and radial slits 25 of cap 15 and is forced downwardly between the flexible sectors 26 approximately until the material to be disposed of is below the surface 22 of the cap. The forceps are then wtihdrawn, sectors 26 sliding along the legs of the forceps as they are withdrawn, the square-edged under surfaces thereof effectively scraping all the material held between the forceps into the cup 14.

The foregoing procedure is repeated for each bunch of used cotton or other material removed from a patient's mouth. When work on a particular patient is completed, waste receptacle 10 is removed from the base and disposed of in a suitable manner. A fresh receptacle 10 is then inserted into the base for use with the next patient.

As previously explained, the waste receptacle of this invention not only has great efficiency in removing material carried by a pair of forceps but also reduces the possibility of cross-contamination between patients. Thus, cap 15 extends well above the top surface 32 of base 12 so that surface 32 acts as a rest for the dentist's hand whereby the fingers may guide the forceps and contaminated material accurately to the center of the cap, preventing accidentally touching the base 12. Likewise, the possibility of contamination of the base by liquids dripping over the edge of the top of the cap is reduced by the provision of annular bead 40.

The invention in its broader aspects is not limited to the specific embodiments herein shown and described but departures may be made therefrom within the scope of the accompanying claims, without departing from the principles of the invention and without sacrificing its chief advantages.

What is claimed is:

1. A waste receptacle comprising, a closed container member for receiving waste material from the ends of a pair of forceps or the like, one end of said container having a plurality of equispaced radial slits formed therein so as to form an equal plurality of sectors therebetween, said slits intersecting at a common hole located substantially centrally of said container end, said hole having a diameter greater than the width of any one of said slits, the outer surface of each of said sectors being scored adjacent each of said slits so as to form a lead on the outer edges of said slits, said lead on said slits facilitating entry of said forceps and waste material into said container, the inner edges of said slits being substantially square, so as to facilitate retention of the waste material within said container upon withdrawal of the forceps therefrom.

2. A waste receptacle as claimed in claim 1, wherein the lead on the outer edges of said radial slits is beveled and extends over a major portion of the thickness of the container cap.

3. A waste receptacle as claimed in claim 1, wherein the lead on the outer edges of said radial slits is curvilinear and extends over a major portion of the thickness of the container cap.

4. A waste receptacle as claimed in claim 1, wherein said container end includes an annular bead extending around the top peripheral edge thereof.

5. A waste receptacle as claimed in claim 1 wherein the outer peripheral surface of said container member includes a plurality of longitudinal splines, said plurality of splines being equal in number to said plurality of radial slits, and each of said splines being positioned in direct alignment with a respective one of said radial slits.

6. A waste receptacle as claimed in claim 5 wherein said container end is formed with five equispaced radial slits and the outer peripheral surface of said container includes five longitudinal splines.

7. In combination, a waste receptacle comprising, a closed, hollow, substantially cylindrical container, said container including a cup member having a cap fitted thereon, the bottom peripheral edge of said container cap forming an annular lip around said cup member, said container cap having a plurality of equispaced radial slits formed therein so as to form an equal plurality of sectors therebetween, said slits intersecting at a common hole located substantially centrally of said container end, said hole having a diameter greater than the width of any one of said slits, the outer surface of each of said sectors being scored adjacent each of said slits so as to form a lead on the outer edges of said slits, said lead on said slits facilitating entry of forceps and waste material into said container, the inner edges of said slits being substantially square, so as to facilitate retention of the waste material within said container upon withdrawal of the forceps therefrom, the outer peripheral surface of said container cap including a plurality of longitudinal splines, said plurality of splines being equal in number to said plurality of radial slits, each of said splines being positioned in direct alignment with a respective one of said radial slits; and an open-ended supporting base member, said base member having a cylindrical bore formed therethrough, said bore including an annular shoulder adapted to seat the bottom peripheral edge of said container cap, said shoulder further adapted to position said container cap so that it extends above the top of said supporting base when said cap is seated thereon, the diameter of said bore below said shoulder being greater than the diameter of said cup member and the diameter of said bore above said shoulder being substantially equal to the diameter of said container cap, whereby said container cap is adapted to be receivably mounted in said supporting base in friction-fitting relationship, said plurality of longitudinal splines on the outer peripheral surface of said container cap directing the lateral pressure radially along each of said slits toward the center of said cap.

8. In combination, a waste receptacle comprising a closed container member for receiving waste material from the ends of a pair of forceps or the like, one end of said container having a plurality of equispaced radial slits formed therein so as to form an equal plurality of sectors therebetween, said slits intersecting at a common hole located substantially centrally of said container end, the outer surface of each of said sectors being scored adjacent each of said slits so as to form a lead on the outer edges of said slits, said lead on said slits facilitating entry of said forceps and waste material into said container, the inner edges of said slits being substantially square so as to facilitate retention of the waste material within said container upon withdrawal of the forceps therefrom, the outer peripheral surface of said container member including a plurality of longitudinal splines, said plurality of splines being equal in number to said plurality of radial slits, each of said splines being positioned in direct alignment with a respective one of said radial slits; and a supporting base member in which said waste receptacle is receivably mounted in friction-fitting relationship, said plurality of longitudinal splines directing the lateral pressure forces resulting from said friction-fit radially along each of said slits toward the center of said container member.

9. In an article for receiving waste material from the ends of a pair of forceps or the like including a waste receptacle receivably mounted in friction-fitting relationship in a supporting base member, and wherein the waste receptacle is in the form of a closed container member, one end of said container having a plurality of equispaced radial slits formed therein so as to form an equal plurality of sectors therebetween, the improvement therein which comprises: said slits intersecting at a common hole located substantially centrally of said container end, the outer surface of each of said sectors being scored adjacent each of said slits so as to form a lead on the outer edges of said slits, said lead on said slits facilitating entry of said forceps and waste material into said container, the inner edges of said slits being substantially square so as to facilitate retention of the waste material within said container upon withdrawal of the forceps therefrom, and the outer peripheral surface of said container member including a plurality of longitudinal splines, said plurality of splines being equal in number to said plurality of radial slits and positioned in direct alignment with a respective one of said radial slits, whereby said splines direct the lateral pressure forces resulting from the friction-fit between said container and said base radially along each of said slits toward the center of said container.

References Cited

UNITED STATES PATENTS

| | | | |
|---|---|---|---|
| 3,004,566 | 10/1961 | Raimo. | |
| 2,826,230 | 3/1958 | Conell. | |
| 2,076,549 | 4/1937 | Conner | 215—6 |
| 2,553,232 | 5/1951 | Beger | 206—63.5 |
| 620,222 | 2/1899 | Browne et al. | 206—63.5 |
| 963,794 | 7/1910 | Moffitt | 206—63.5 |
| 2,328,246 | 8/1943 | Albion. | |

JOSEPH R. LECLAIR, *Primary Examiner.*

LOUIS G. MANCENE, THERON E. CONDON, *Examiners.*

J. M. CASKIE, *Assistant Examiner.*